Jan. 25, 1966
N. ROBINSON
3,231,331
CHEMICAL PROCESS FOR THE PRODUCTION OF PHOSPHORIC ACID
Filed Nov. 13, 1961
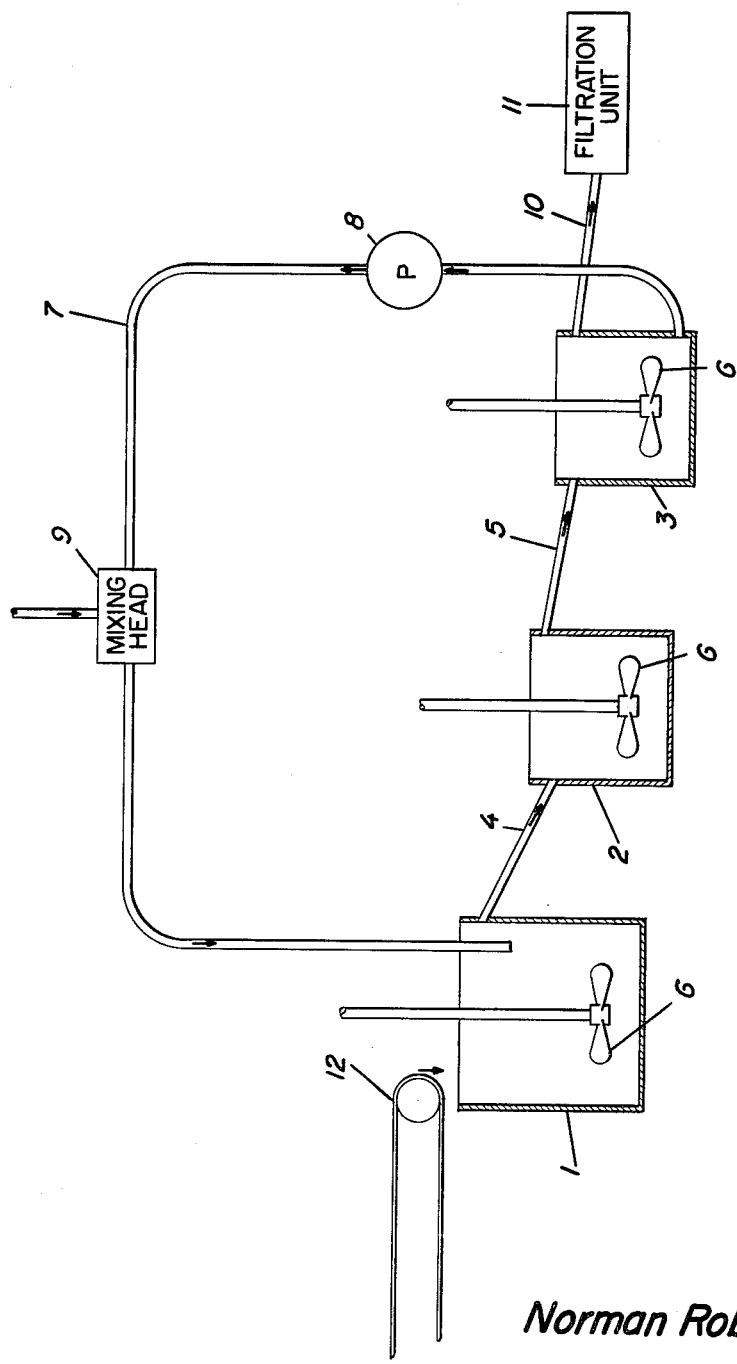
INVENTOR
*Norman Robinson*
by Henderoth, Lind & Ponack
Attorneys

United States Patent Office 3,231,331
Patented Jan. 25, 1966

3,231,331
CHEMICAL PROCESS FOR THE PRODUCTION OF PHOSPHORIC ACID
Norman Robinson, Felixstowe, England, assignor to Fisons Fertilizers Limited, Felixstowe, England, a British company
Filed Nov. 13, 1961, Ser. No. 151,752
Claims priority, application Great Britain, Aug. 31, 1961, 31,287/61
11 Claims. (Cl. 23—165)

The present invention relates to an improved system for the manufacture of phosphoric acid.

Phosphoric acid may be manufactured continuously by the wet process from phosphate rock and sulphuric acid, the sulphuric acid being diluted with slurry from a previous operation of the process. In this way the concentration of sulphate ions may be kept below a certain maximum above which the particles of phosphate rock become coated with calcium sulphate so preventing further reaction. A single large reaction vessel is sometimes used for this purpose but it can be shown theoretically and has been shown in practice that a series of vessels is more effective. In a conventional type of plant a series of connected reaction vessels of equal size may be used and generally the first vessel is smaller than the subsequent vessels. In such a plant the phosphate rock and diluted sulphuric acid are fed to the first vessel; the reactants then flow through the subsequent vessels in which further reaction occurs. A part of the product in the last vessel is removed; the major part is recirculated to the first vessel.

It has now been found that definite operating and economic advantages are to be obtained if the holding time of the reactants in the first reaction vessel is increased in comparison to the holding time in the succeeding vessels. This may be achieved by using a first reaction vessel which is larger in size than the succeeding vessels. Assuming ideal and efficient mixing throughout the volume of the vessel the sulphate ion concentration is minimised in the first vessel due to the fact that a greater proportion of the sulphate ions are precipitated as calcium sulphate.

Accordingly therefore the present invention is for a continuous process for the manufacture of phosphoric acid in a series of vessels which comprises adding the phosphate rock to the first vessel in the series, with agitation, adding sulphuric acid to the system so that this is diluted with the other reactants or recycle liquors before entering the first vessel, and circulating the reaction mixture with agitation through the subsequent vessels in the series, withdrawing part of the reaction mixture for the separation of the product, and recirculating part of the reaction mixture from the last vessel in the series to the first vessel in the series, the holding time in said first vessel being greater than the holding time in the other vessels.

The sulphuric acid may be added to any part of the system such that this is diluted with the reaction mixture before coming into contact with the rock. The sulphuric acid may for example be added to any of the vessels subsequent to the first vessel. It is usually most convenient to add the sulphuric acid to the recycle line from the last vessel to the first vessel, either by direct injection into the recycle line or in a special mixing vessel.

Although the wet process for the production of phosphoric acid is loosely referred to as the reaction of phosphate rock and sulphuric acid, the phosphate rock is in fact simultaneously attacked with a large excess of recycle phosphoric acid together with approximately the stoichiometric amount of sulphuric acid.

The reaction may be represented by the following formula:

$$Ca_{10}(PO_4)_6F_2 + 10H_2SO_4 + 14H_3PO_4 + 2H_2O \rightarrow 20H_3PO_4 + 10CaSO_4 \cdot 2H_2O + 2HF$$

In a preferred embodiment of the process of the present invention the holding-time in the first vessel is up to five times, for example 1.5 to 5 times, greater than the holding-time in any one of the other vessels. Suitably the holding-time in the first vessel is about double the holding-time in any one of the other reaction vessels.

The overall holding time in the reaction system should be such as to allow substantially complete reaction. The speed of the reaction is related to particle size of the phosphate rock and the reactivity of the rock. For example with a particular rock, the reaction will proceed more quickly where the rock is finely ground than where the rock is coarsely ground. The phosphate rock as normally received from the mines has already been coarsely ground; this material although particulate is of variable particle size. In the art, the rock is frequently finely ground, for example such that about 50% passes a 100 B.S.S. mesh sieve, to prepare this for the reaction. Additionally some rocks react more readily than others, and for example Morocco phosphate rock is generally recognised as a reactive rock and the phosphate rocks from mines such as Kola and Palabora are generally recognised as less reactive rocks. Reactive rocks such as finely ground Morocco rock require a holding-time of only 2–3 minutes in the first of three reaction vessels whereas finely ground less reactive rocks such as Kola or Palabora rocks may require a holding-time of at least 5 minutes. For coarsely ground rocks the holding time is at least 20 minutes in the first of three reaction vessels.

The apparatus and process of the present invention are of particular utility in the treatment of a phosphate rock, which is either a reactive rock such as Morocco, which is not finely ground (coarsely ground rock as received from the mines), or an unreactive rock, such as Kola or Palabora rock, which may be finely ground or coarsely ground.

It is a feature of the present invention that the number of reaction vessels necessary is low and as few as three vessels may be used. Naturally a greater number of vessels may be used, for example 2–20; however it is preferred to use 3–6 vessels. The recycle ratio, which is the ratio of the weight of slurry returned from the final reaction vessel to the first reaction vessel to the weight of sulphuric acid and rock fed to the reaction system, will depend on the degree to which it is wished to dilute the sulphuric acid. The recycle ratio is suitably in the range 6:1 to 24:1 and is preferably 12:1.

In the process of the present invention a slight excess of sulphuric acid over that equivalent to the calcium in the rock is preferably employed. The concentration of sulphuric acid in the recycled slurry fed to the first vessel is advantageously in the range 1–5% and is preferably 3 to 3.5% by weight.

The present invention also provides an apparatus adapted for the manufacture of phosphoric acid by the reaction of phosphate rock and sulphuric acid which comprises a plurality of vessels, communicating means connecting said vessels in series, means capable of transferring material from the last of said vessels to the first, and means for the agitation of said vessels, said first vessel having a larger volume than each of the subsequent vessels.

The means capable of transferring material from the last of the reaction vessels to the first is suitably a conduit provided with an impeller. The means for feeding sulphuric acid to the reaction system may be incorporated into this conduit.

The volume of each of the other vessels is suitably 20–70% of the volume of the first vessel. Preferably the volume of the other vessels is about half that of the first vessel.

The apparatus of the present invention is illustrated by the accompanying drawing in which vessels 1, 2 and 3 are joined by conduits 4 and 5. Vessel 1 is approximately twice the size of vessels 2 and 3. All three vessels are provided with agitators 6. Means 12 are provided for feeding ground phosphate rock to vessel 1. A recycle line 7 is provided from vessel 3 to vessel 1. A pump 8 and a mixing head 9 are provided in the recycle line 7. A line 10 leads from vessel 3 to a filtration unit 11.

In operation phosphate rock is fed to vessel 1 by means 12 together with material recycled from vessel 3 and sulphuric acid that is added to the recycle material at mixing head 9. The mixture in vessel 1 then flows through vessels 2 and 3. About 8–14% of the mixture in vessel 3 is bled off along line 10 to filtration unit 11 where the product phosphoric acid is separated.

The remainder of the mixture in vessel 3 is recycled by pump 8 through mixing head 9 to vessel 1. At mixing head 9 the required concentrated sulphuric acid is added.

The holding time in vessel 1 for coarsely ground rocks is arranged to be up to 20 minutes and for finely ground rocks up to 5 minutes. The holding time in each of vessels 2 and 3 for coarsely ground rocks is arranged to be up to 10 minutes and for finely ground rocks up to 3 minutes. The holding-time of the material in vessel 1 can be varied by adjusting the throughput. The holding-time of the material in vessels 2 and 3 will also depend on the throughput but preferably the holding time in these vessels is also adjustable by for example varying the position of conduits 4 and 5.

The following examples illustrate the process of the present invention.

*Example 1*

An apparatus of the type described above and illustrated in the accompanying drawing was used, the first vessel having a holding-time of 5 minutes and the other two vessels each having holding-times of 3 minutes. With a recycle ratio of 12:1, Kola rock was fed to the first vessel, and sulphuric acid to the mixing head 9, in amounts such that the take-off or product acid had a composition 31% $P_2O_5$ and 1.5% sulphate ion concentration. The particle size of the rock was such that 84% passed through a 100 B.S.S. sieve and 44% passed through a 240 B.S.S. sieve. The mixed acid had the composition 28.5% $P_2O_5$ and 3.1% $H_2SO_4$. The reaction temperature was 75° C. At equilibrium the conversion of $P_2O_5$ in the rock to phosphoric acid was 95%.

In contrast an apparatus in which four vessels were used having holding-times of 2, 2, 5 and 5 minutes but otherwise employing the same reaction conditions resulted in the conversion of only 90% of the $P_2O_5$ in the rock to phosphoric acid.

*Example 2*

The process as described in Example 1 was repeated using Morocco rock having the following sieve analysis: 6% retained on a 12 B.S.S. sieve, 35% passed through a 100 B.S.S. sieve and 10% passed through a 240 B.S.S. sieve, and employing vessels having holding-times of 20, 5 and 5 minutes respectively. At equilibrium the conversion of $P_2O_5$ in the rock to phosphoric acid was 94%.

In contrast an apparatus in which four vessels were used having holding-times of 5, 5, 10 and 10 minutes respectively but otherwise employing the same reaction conditions resulted in the conversion of only 65% of the $P_2O_5$ in the rock to phosphoric acid.

*Example 3*

The process as described in Example 1 was repeated using Morocco rock having the following sieve analysis: 70% passed through a 100 B.S.S. sieve and 36% passed through a 240 B.S.S. sieve, and employing vessels having holding-times of 5, 3 and 3 minutes respectively. At equilibrium the conversion of $P_2O_5$ in the rock to phosphoric acid was 96%.

I claim:

1. A continuous process for the manufacture of phosphoric acid by the reaction of phosphate rock and sulphuric acid and recycled phosphoric acid in a series of 2 to 20 vessels which comprises adding the phosphate rock to the first vessel in the series, agitating the contents of the first vessel, circulating the reaction mixture, which comprises gypsum and phosphoric acid, with agitation through the subsequent vessels in the series, withdrawing part of the reaction mixture for separation of phosphoric acid from the last vessel in the series, and withdrawing another part of said reaction mixture and adding sulfuric acid thereto and recirculating same from the last vessel in the series to the first vessel in the series, the holding time in said first vessel being about 1.5 to 5 times greater than the holding time in any of the other vessels.

2. A continuous process as claimed in claim 1 wherein the holding time in said first vessel is double the holding time in any of the subsequent vessels.

3. A continuous process as claimed in claim 1 wherein the series of vessels comprises 2–6 vessels.

4. A continuous process as claimed in claim 1 wherein the series of vessels comprises 3 vessels.

5. A continuous process as claimed in claim 1 wherein the recycle ratio is in the range 6:1 to 24:1.

6. A continuous process as claimed in claim 1 wherein the recycle ratio is 12:1.

7. A continuous process as claimed in claim 1 wherein an excess of sulphuric acid is employed.

8. A continuous process as claimed in claim 1 wherein the concentration of sulphuric acid in the recycle from the last vessel in the series to the first vessel in the series is 1 to 5% by weight.

9. A continuous process as claimed in claim 1 wherein the phosphate rock is a coarsely ground reactive rock.

10. A continuous process as claimed in claim 1 wherein the phosphate rock is a less reactive rock selected from the group consisting of Kola rock and Palabora rock.

11. A continuous process for the manufacture of phosphoric acid by the reaction of phosphate rock and sulphuric acid in a series of vessels which comprises adding the phosphate rock to the first vessel in the series under agitation, circulating the reaction mixture, which comprises gypsum and phosphoric acid, with agitation through the subsequent vessels in the series, withdrawing part of the reaction mixture for separation of phosphoric acid from the last vessel in the series, recycling part of the reaction mixture and adding sulphuric acid thereto so that the concentration of sulphuric acid is 3–3.5% by weight, from the last vessel in the series to the first vessel in the series, the recycle ratio being about 12:1, the holding time in said first vessel being double the holding time in any of the subsequent vessels.

References Cited by the Examiner

UNITED STATES PATENTS

| | | | |
|---|---|---|---|
| 2,049,032 | 7/1936 | Weber et al. | 23—165 |
| 2,233,956 | 3/1941 | Moore | 23—165 |
| 3,003,852 | 10/1961 | Nordengren | 23—165 |
| 3,017,247 | 1/1962 | Huxley | 23—165 |

BENJAMIN HENKIN, *Primary Examiner.*

MAURICE A. BRINDISI, *Examiner.*